United States Patent [19]

Nakamura et al.

[11] Patent Number: 4,910,276

[45] Date of Patent: Mar. 20, 1990

[54] CYCLIC POLYMERIZATION

[75] Inventors: Masaru Nakamura, Tokyo; Isamu Kaneko, Yamato; Kazuya Oharu, Yokohama; Gen Kojima, Machida; Masashi Matsuo, Yokohama; Shunichi Samejima, Tokyo; Motoi Kamba, Yokohama, all of Japan

[73] Assignee: Asahi Glass Company, Ltd., Tokyo, Japan

[21] Appl. No.: 233,821

[22] Filed: Aug. 10, 1988

[30] Foreign Application Priority Data

Aug. 14, 1987 [JP] Japan ................................. 62-201864

[51] Int. Cl.[4] ............................................. C08F 16/24
[52] U.S. Cl. ..................................... 526/247; 526/252
[58] Field of Search ................................ 526/247, 252

[56] References Cited

U.S. PATENT DOCUMENTS

| | | | |
|---|---|---|---|
| 2,729,613 | 1/1956 | Miller | 526/252 |
| 2,917,496 | 12/1959 | Hann | 526/252 |
| 3,084,144 | 4/1963 | Crawford, Jr. | 526/252 |
| 3,114,778 | 12/1963 | Fritz et al. | 526/247 |
| 3,274,265 | 9/1966 | Tatlow et al. | 526/252 |
| 3,310,606 | 3/1967 | Fritz | 526/247 |
| 3,397,191 | 8/1968 | Beckerbauer | 526/247 |
| 3,418,382 | 12/1968 | Darby | 526/247 |

FOREIGN PATENT DOCUMENTS 1106344  3/1968  United Kingdom .

Primary Examiner—Joseph L. Schofer
Assistant Examiner—N. Sarofin
Attorney, Agent, or Firm—Oblon, Spivak, McClelland, Maier & Neustadt

[57] ABSTRACT

A method for cyclic polymerization, wherein a fluorine-containing monomer is subjected to cyclic polymerization, the fluorine-containing monomer having two carbon-carbon multiple bonds, each having different polymerizability, as linked by a linking chain having a straight chain portion to from 2 to 7 atoms, and having a fluorine content of at least 10% by weight.

12 Claims, No Drawings

CYCLIC POLYMERIZATION

This invention relates to a method for cyclic polymerization, and more particularly, it is concerned with a novel cyclic polymerization to produce a fluorine-containing polymer having a cyclic structure in its main chain by use of a particular fluorine-containing monomer.

With regard to the cyclic polymerization of hydrocarbon-type monomers, there have been done various researches, and a multitude of reports have been known in general, inclusive of three-membered cyclic polyether to large-membered cyclic polyether.

On the other hand, there have been known various fluorine-containing polymers, of which polytetrafluoroethylene and many others are already practically put into industrial use. However, these fluorine-containing polymers mostly contain therein the straight main chain based on vinyl monomer such as fluoro-olefin, (meth)acrylate having the fluoro-alkyl group in its side chain, etc. There has also been known a high molecular weight compound such as perfluoro-polyether to be obtained by the ring-opening polymerization of a hexafluoropropylene oxide. In this case, too, the structure of the main chain is of the straight chain. Furthermore, in recent years, attempt has been made on the synthesis of a polymer having a cyclic structure of

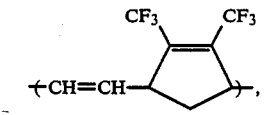

in the main chain by the metathesis polymerization of a monomer such as

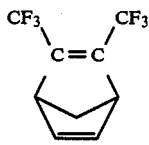

in the presence of a molybdenum type catalyst (vide: A. Alimuniar et al., Polymer, 1986 27 1281.). These fluorine-containing polymers are obtained by the ordinary vinyl polymerization, or the ring-opening, or the ring-opening metathesis polymerization, and not by introduction of the cyclic structure into the main chain due to the cyclic polymerization from structure straight chain monomers.

It has only been known that a compound of a general formula: $CF_2=CF-(CF_2)_xCF=CF_2$ (where: x is an integer of from 1 to 5) undergoes the cyclic polymerization by the gamma rays (vide: L. A. Waal, Fluoropolymer, Wiley-Science, 4, High Pressure Polymerization, p 127). It has also been known that a compound represented by the following general formula: $CF_2=CF-CF_2-CFCl-CF_2-CF=CF_2$ is polymerized to yield a transparent and highly elastic film which is excellent in its heat-resistance and oxidation-resistance (vide: D. S. Ballentine et al., U.S. Atomic Energy Commission, BNL-294 (T-50) 18, 1954). All these methods are, however, the high pressure polymerization method which require a pressure value as high as 10,000 atm. or above, hence the method possesses a disadvantage such that it is difficult to be put into industrial exploitation.

Moreover, in British patent specification No. 1,106,344, U.S. Pat. No. 3,418,302, and others, there is described a method of cyclic polymerization of a monomeric substance of perfluorodimethylene-bis(perfluorovinyl ether) which is represented by $CF_2=CF-O-CF_2-CF_2-O-CF=CF_2$. In this polymerization method, however, there is a restriction such that the cyclic polymerization is carried out only under a diluting condition where the monomer concentration is 12% by weight or below. These patent specifications mention that when the monomer concentration exceeds 12% by weight, there is produced a polymer having a repeating unit of

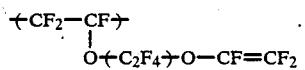

The fact that the monomer concentration should be kept at 12% or below is disadvantageous in the industrial practice of the method.

According to the researches and studies made by the present inventor, in case the hydrocarbon-type monomers are used, the cyclic polymerization can be done relatively smoothly and advantageously without being governed by the molecular structure of the monomeric substances. However, with regard to the fluorine-containing monomers having the fluorine content of 10% by weight or above, in particular perfluoro monomer, there has been scarcely known, to date, a method which is capable of producing the polymer having the cyclic structure in its main chain from a straight chain monomer in an industrially advantageous and smooth manner, as has been described in the foregoing. In the case of a fluorine-containing monomer having the above-mentioned symmetrical molecular structure, the particular condition as mentioned above should necessarily be adopted in the cyclic polymerization, and a point of difficulty is recognized generally in that gel is by-produced remarkably to make it difficult to proceed the cyclic polymerization. Also, in the cyclic polymerization using the fluorine-containing monomer such as the above-mentioned perfluoro-dimethylene-bis(perfluorovinyl ether), there is recognized, in similar manner, the disadvantage of gel being by-produced in the polymerization reaction, besides the restriction of the polymerization to be done under a high diluting condition as mentioned above, on account of the monomeric substance being symmetrical in its molecular structure.

The present inventor has been strenuously engaged in continued researches and studies on the method of producing the fluorine-containing polymer having the cyclic structure in its main chain from a fluorine-containing monomer having the straight chain, as the result of which he has come to a new observation and finding such that a fluorine-containing monomer with a fluorine content of 10% by weight or above is required to have a particular molecular structure for its advantageous cyclic polymerization. In more detail, the monomeric substance should have in its molecules two polymerizing groups, each having different polymerizability, and should have two to seven atoms in the straight chain portion of a linking chain which links these two polymerizing groups together. Thus, the present inventor has found out that the fluorine-containing monomer having such particular molecular structure, even in the case of perfluoro monomer, is, surprisingly enough, capable of advancing the cyclic polymerization in a smooth and advantageous manner by suppressing by-production of gel without necessity whatsoever for adopting the very high pressure condition and the high diluting condition.

The present invention has thus been completed on the basis of such new observation and finding as mentioned above, and provides a novel cyclic polymerization method, which is characterized in subjecting a fluorine-containing monomer to the cyclic polymerization, the fluorine-containing monomer having two carbon-carbon multiple bonds, each having different polymerizability, as linked by a linking chain having a straight chain portion of from two to seven atoms, and having a fluorine content of 10% by weight or above.

It is important in the present invention to use a fluorine-containing monomer having a particular molecular structure. First of all, the monomer contains two carbon-carbon multiple bonds, each having different polymerizability. Usually, carbon-carbon double bond is adopted, or two multiple bond having different kinds and structures is adopted. Examples of such bond are: fluorine monomer having two multiple bonds of asymmetrical structure; vinyl ether group and allyl group; vinyl ether group and vinyl group; fluorine-containing multiple bond and hydrocarbon multiple bond; perfluoro multiple bond and partially fluorinated multiple bond; and so forth. In the second place, the number of atoms in the straight chain portion of the linking chain for connecting these two carbon-carbon multiple bonds is required to be from 2 to 7. In case the number of atoms in the straight chain portion of the linking chain is zero or 1, the cyclic polymerization is difficult to occur. The same thing can be said when the number of atom is 8 or more. A preferred number of atoms should usually be from 2 to 5. Also, the linking chain is not limited to the straight chain form, but it may be in the side-chain structure or in the cyclic structure. Further, the constituent atom is not limited to carbon, but various hetero-atoms such as oxygen (O), sulfur (S), nitrogen (N), etc. may be contained therein. In the third place, the fluorine-containing monomer in the present invention has the fluorine content of 10% by weight or more. When the fluorine content is too low, it becomes difficult to exhibit the specificity which the fluorine atom possesses. In the present invention, as a matter of course, perfluoro monomer is used preferably.

As the concentrate examples of the particular fluorine-containing monomers as mentioned above, the following are enumerated.

$CF_2=CFOCF_2CF=CF_2$, $CF_2=CFOCF_2CF_2CF=CF_2$, $CF_2=CFOCF_2CF=CH_2$, $CF_2=CFOCF_2CFCF=CF_2$,
$\qquad\qquad\qquad\qquad\qquad\qquad\quad |$
$\qquad\qquad\qquad\qquad\qquad\qquad\ \ CF_3$

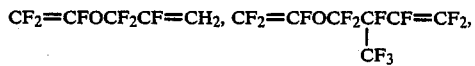

$CF_2=CFOCF_2OCF_2CF=CF_2$, $CF_2=CFOCF_2CF_2CH=CH_2$, $$CF_2=CFOCF_2(CH_2)_nNHCCH=CH_2$$
$\qquad\qquad\qquad\qquad\qquad\qquad\|$
$\qquad\qquad\qquad\qquad\qquad\qquad O$ (where: $n$ is an integer of 1 to 4),

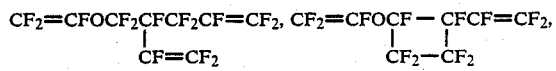

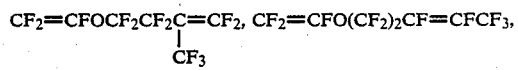

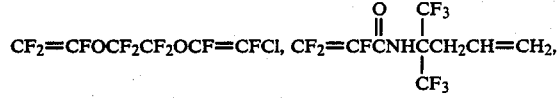

$CF_2=CFCF_2CF_2CH=CH_2$, $CF_2=CFCF_2CFCH=CH_2$,
$\qquad\qquad\qquad\qquad\qquad\qquad\qquad\qquad\ \ |$
$\qquad\qquad\qquad\qquad\qquad\qquad\qquad\qquad CF_3$

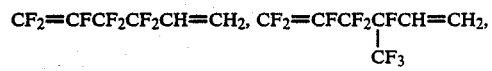

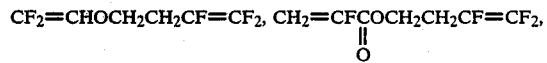

For the purpose of the present invention, the fluorine-containing monomer having a single vinyl ether group and being represented by $CF_2=CFO-$ is preferably adopted in points of its polymerization reactivity, cyclic polymerizability, suppression of gellation, and others. Particularly preferred examples are perfluoroallyl vinyl ether ($CF_2=CFOCF_2CF=CF_2$) and perfluorobutenyl vinyl ether ($CF_2=CFOCF_2CF_2CF=CF_2$).

These particular fluorine-containing monomers have been found to possess a surprising property such that it brings about the polymerization under relatively moderate conditions to result in a polymer having the cyclic structure in its main chain. The present invention has been reached on the basis of this finding. That is to say, the polymerization method is not at all restricted to any specific one, provided that the polymerization proceeds radically. Examples are those polymerization, in which use is made of an inorganic radical initiator, light rays, ionizing radiation, or heat. As the radical initiator, there may be exemplified azo compounds such as 2,2'-azo-bis(N,N'-dimethylene isobutylamine)dihydrochloride, 2,2'-azo-bis(2-amidino-propane)dihydrochloride, 2,2'-azo-bis(N,N'-dimethylene isobutyl amidine), 4,4'-azo-bis(4-cyanopentanoic acid), 2,2'-azo-bis{2-methyl-N-[1,1-bis(hydroxymethyl)-2-hydroxyethyl]propione amide}, 2,2'-azo-bis{2-methyl-N-[1,1-bis(hydroxymethyl)ethyl]-propione amide}, 2,2'-azo-bis[2-methyl-N-(2-hydroxyethyl)propione amide], 2,2'-azo-bis(isobutyl amide)dihydrate, 2,2'-azo-bis(4-methoxy-2,4-dimethyl valeronitrile), 2,2'-azo-bis(2,4-dimethyl valeronitrile), (1-phenylethyl)azo-diphenyl methane, 2,2'-azo-bis-isobutyronitrile, dimethyl-2,2'-azo-bis-isobutyrate, 2,2'-azo-bis(2-methybutyronitrile), 1,1'-azo-bis(1-cyclohexane carbonitrile), 2-(carbamoyl azo)-isobutyronitrile, 2,2'-azo-bis(2,4,4-trimethyl pentane), 2-phenylazo-2,4-dimethyl-4-methoxy valeronitrile, 2,2'-azo-bis(2-methyl propane); organic peroxides such as stearoyl peroxide, diisopropyl peroxydicarbonate, benzoyl peroxyde, 2,4-dichlorobenzoyl peroxide, acetyl peroxide, t-butyl hydroperoxide, cumene hydroperoxide, diisopropyl benzene hydroperoxide, para-methane-hydroperoxide, 2,5- dimethyl hexane-2,5-dihydroperoxide, methylethyl ketone peroxide, cyclohexane peroxide, di-t-butyl peroxide, dicumyl peroxide, t-butyl cumyl peroxide, 2,5-dimethyl-2,5-di(t-butyl peroxide)hexane, 2,5-dimethyl-2,5-di(t-butyl peroxy)hexene-3, octanoyl peroxide, decanoyl peroxide, lauroyl peroxide, t-butyl perbenzoate, t-butyl peracetate, t-butyl perpivalate, t-butyl perisobutylate, t-butyl peroxyisopropyl carbonate, di-t-butyl-diperphthalate, t-butyl perlaurate, 2,5-dimethyl-2,5-di(benzoyl peroxy)hexane, di-perfluorobutanoic peroxide, di-perfluoro-3-oxa-methylhexanoic peroxide, di-perfluorononaic peroxide and so forth; and inorganic peroxides such as $K_2S_2O_8$, $(NH_4)_2S_2O_8$. Examples of the lights are visible light, ultra-violet rays, etc., with which photo-sensitizers may be used. As the ionizing radiation rays, there may be exemplified gamma rays, beta rays, alpha rays from radioactive isotopes such as $^{60}$Co, $^{192}$Ir, $^{170}$Tm, $^{137}$Cs and so on, and electron beams produced from an electron beam accelerator.

The polymerization method is also not particularly limitative, and there may be used those various methods such as the so-called bulk-polymerization, wherein monomeric substance is subjected to the polymerization as it is; the solution-polymerization, wherein the polymerization is conducted in fluoro-hydrocarbon, chloro-hydrocarbon, fluoro-chloro-hydrocarbon, alcohol, hydrocarbons, and other organic solvents; the suspension-polymerization, wherein the polymerization is carried out in an aqueous medium in the presence or absence of an appropriate organic solvent; the emulsion-polymerization, wherein the polymerization is conducted in an aqueous medium with addition thereto of an emulsifier; and so fourth. No particular limitation is also imposed on the temperature and pressure for the polymerization. It is, however, desirable that they may be established appropriately by taking into consideration various factors such as the boiling point of the monomer, the required heating source, the removal of heat from polymerization, and so on. For instance, the temperature may be adequately set between 0° C. and 200° C., and an appropriate temperature setting can be done practically with a temperature ranging from a room temperature to 100° C. The pressure for the polymerization may either be under a reduced pressure or be under an increased pressure. A suitable polymerization can be carried out practically with a pressure ranging from a normal pressure to 100 atm, or so, and more preferably from a normal pressure to 50 atm, or so.

The cyclic polymerization method according to the present invention can be applied to the homo-polymerization of one kind of the above-mentioned particular fluorine-containing monomers, and can also be applied to the copolymerization of two or more kinds of these fluorine-containing monomers or the copolymerization of such monomer(s) with other monomer(s). Such other monomers to be copolymerized with the above-mentioned particular fluorine-containing monomers are not so limitative, provided that they have the radical-polymerizability, hence they can be selected widely from fluorine-containing type, hydrocarbon type, and others. It goes without saying that only one kind of such other monomers may be subjected to the radical copolymerization with the particular fluorine-containing monomer, or two or more appropriate kinds of such other monomers may be subjected to the above-mentioned copolymerization reaction. In order to make much use of the characteristics of the particular fluorine-containing monomer in the present invention, it is usually desirable that the fluorine-containing type monomer such as fluoroolefin, fluorovinyl ether, etc. be selected as such other monomer. Preferred examples are: tetrafluoroethylene, perfluoromethylvinylether, perfluoropropylvinylether, perfluorovinylethers having a functional group such as carboxyl group or sulfonic acid group, and so forth. There may also be used vinylidene fluoride, vinyl fluoride, chloro-tri-fluoro-ethylene, etc.

In the present invention, when the particular fluorine-containing monomer is to be copolymerized with other monomer, there is no particular reason to limit the ratio of copolymerization of the particular fluorine-containing monomer. However, from the standpoint of improving various performances to be described later by introduction of the cyclic structure into the main chain, 0.1 mol % or more of the particular fluorine-containing monomer in terms of the charging composition is used with respect to such other monomer.

The fluorine-containing polymer to be obtained by the present invention contains therein the cyclic structure in its main chain, so that it possesses high chemical stability and heat-resistance, in spite of its being an amorphous, transparent polymer which is soluble in a solvent. In addition, it has a low refractive index, a high transmissibility to light rays, and a high selective permeability to He, and so on. Further, the fluorine-containing polymer according to the present invention can be formed into a vary thin film in a state of its being perfectly free from pin-hole and other defects, which has been difficult to achieve with the conventional fluorine-containing polymer. In view of such characteristics properties, the field of application where the fluorine-containing polymer of the present invention exhibits its usefulness are, for example, transparent coating material, painting material, insulating film, weather resistant film, optical material, separating membrane, and others.

In the present invention, when the particular fluorine-containing monomer is copolymerized with other monomer, for example, with $CF_2=CF_2$, the crystallinity of such copolymer can be made lower than that of polytetrafluoroethylene (hereinafter abbreviated as "PTFE"). As the consequence of this, the copolymer becomes feasible for the melt-forming, and its transparency is also improved. Moreover, when the composition of the cyclic portion of this copolymer is increased, it becomes meltable and can be formed into film by casting. That is to say, the resulting copolymer with tetrafluoroethylene becomes easier than PTFE in its shaping, on account of which the copolymer can be used for various shaped bodies having the performance of the fluorine-containing resin, which is equal to that of PTFE. Further, the copolymer can be used for various coating material, electronics parts, optical materials, etc., taking advantage of its transparency and cast-film forming.

When the fluorine-containing monomer is copolymerized with $CF_2=CH_2$, the transparency of the resulted copolymer improves in comparison with homopolymer of vinylidene fluoride (hereinafter abbreviated as "PVdF"), owing to lowering in its crystallinity and reduction in its crystal grain size. Its refractive index can also be lowered, and its fluorine content can be increased without decreasing its high mechanical strength which is one of the characteristic properties of PVdF. Accordingly, this copolymer is applicable to the entire fields where PVdF is being used currently. In particular, it is most suitable for the fishing string owing to its lowered refractive index and improved transparency. It can also be used for electronics parts and optical parts as the transparent dielectric material. Furthermore, since the copolymer can be formed into film by casting and has high fluorine content, it can be used for providing various shaped bodies and various coating materials, all of which are more excellent than PVdF in its weather-resistant property, solvent-resistant property, heat-resistant property, and chemical stability.

As mentioned above, when any of those known fluorine-containing type monomer and the particular fluorine-containing monomer according to the present invention are copolymerized, the crystallinity of the resulted copolymer can be lowered, or its crystal grain size can be reduced with the consequence that its transparency improves and its melt-forming becomes possible. Also, its mechanical strength such as elasticity, etc. becomes increased. Further, when the composition of the particular fluorine-containing monomer is increased, the obtained copolymer becomes soluble in solvent with the consequent improvement in its opaqueness, shapability, mechanical strength, etc. which are the disadvantageously vulnerable properties of the conventional fluorine-containing polymer.

When the hydrocarbon type monomer is subjected to copolymerization with the particular fluorine-containing monomer, the resultant copolymer becomes capable of retaining the characteristic feature of the fluorine-containing polymer without lowering the performance as the hydrocarbon type polymer, as compared with those hydrocarbon type copolymers and those fluorine-containing type copolymers such as PTFE, PVdF, etc. While the reason for this is still to be clarified, it is considered that the fluorine portion in these copolymers exhibits the cyclic structure and does not produce crystals.

In other aspects, the fluorine-containing polymer to be obtained by the present invention has high gas-separating capability on account its being able to introduce thereinto the fluorine-containing cyclic structure, and hence it can also be used as the material for gas-separating membrane.

In the present invention, the mechanism of the cyclic polymerization, wherein adoption of the very high pressure condition and high diluting condition is no longer required owing to use of the particular fluorine-containing monomer, is yet to be clarified. However, one thought may be given in that the connecting chain with an appropriate length, in particular, the C—O—C bond, has sufficient flexibility, which makes it easy for the two multiple bonds to come closer each other, whereby the cyclic polymerization proceeds even under a low pressure. It may further be considered that, since the two multiple bonds which have been bonded together through the above-mentioned connecting chain possess different polymerization reactivity, there is an increase in the mutual polymerizability with the consequence that the by-production of gel during the polymerization reaction can be suppressed without adoption of the high diluting condition. Incidentally, the preceding explanations are only for assisting the good understanding of the present invention, hence it goes without saying that they are not intent on limiting the scope of the present invention.

In the following, the present invention will be explained in further details in reference to preferred and actual examples thereof. It should also be understood that these examples are only illustrative of the present invention and do not intent to limit the scope of the present invention.

EXAMPLE 1

30 g of perfluoroallyl vinyl ether (hereinafter abbreviated as "PAVE") and 0.3 g of diisopropyl peroxy dicarbonate (hereinafter abbreviated as "IPP") were placed in a glass flask of a 100 cc capacity. After repetition of the degassing under freezing condition for two times, the polymerization was conducted for 16 hours at 25° C. The pressure during the polymerization was lower than the atmospheric pressure. After the polymerization reaction, there was obtained 4.5 g of a polymer.

Upon measurement of the infrared ray absorption spectrum of this polymer, there could be observed no absorption in the vicinity of 1790 cm$^{-1}$ to be derived from the double bond which was present in the starting monomeric substance. Further, when this polymer was dissolved in perfluorobenzene and its $^{19}$F NMR spectrum was measured, there was obtained the spectrum which indicated the following repeating structure.

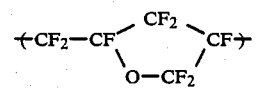

The intrinsic viscosity of this polymer $[\eta]$ was 0.50 at 30° C. in a liquid which is composed principally of "FLUORINATE FC-75" (tradename for perfluoro(2-butyltetrahydrofuran) of 3M Corp, U.S.A., which will hereinafter be abbreviated as "FC-75"). This indicates that the polymer has high degree of polymerization.

The glass transition point of this polymer was 69° C. At a room temperature, this polymer assumed a state of tough and transparent glass. Further, its 10% thermal decomposition temperature was 462° C., which indicated that the polymer had high thermal stability. Furthermore, this polymer had colorless transparency, a low refractive index of 1.34, and a high light transmission factor of 95%.

The gas permeability coefficient of this polymer to various gases was measured, the result of the measurement and the ratio of the permeation coefficient being shown in the following Table.

| Gas | Permeation Coefficient × 10$^{10}$ (cm$^3$ cm/cm$^2$ sec cm11 g) | Pair of Gases | Ratio Permeation Coefficient |
| --- | --- | --- | --- |
| He | 106 | He/N$_2$ | 122 |
| H$_2$ | 26 | He/CH$_4$ | 452 |
| CO$_2$ | 8.6 | CO$_2$/CH$_4$ | 35 |
| O$_2$ | 3.9 | H$_2$/CO | — |
| Ar | — | H$_2$/N$_2$ | 30 |
| N$_2$ | 0.87 | O$_2$/N$_2$ | 4.4 |
| CO | — | | |
| CH$_4$ | 0.24 | | |

EXAMPLE 2

10 g of PAVE, 10 g of trichlorotrifluoroethane (hereinafter abbreviated as "R-113"), and 10 mg of polymerization initiator (IPP) were placed in a glass flask of a 50 cc capacity. After repetition of the degassing under freezing condition for two times, the polymerization was conducted for 14 hours at 40° C. The pressure during the polymerization was lower than the atmospheric pressure. After the polymerization reaction, there was obtained 6.1 g of a polymer.

The intrinsic viscosity of this polymer [η] was 0.37 at 30° C. in "FC-75", hence the resulted polymer was found to have a high molecular weight. It was also discovered from the $^{19}$F NMR spectrum measurement that the polymer was similar to that as obtained in Example 1 above.

EXAMPLE 3

30 g of PAVE and 10 mg of the polymerization initiator

were placed in a glass flask of a 50 cc capacity. After repetition of the degassing under freezing condition for two times, the polymerization was conducted for 16 hours at 30° C. The pressure during the polymerization was lower than the atmospheric pressure. After the polymerization reaction, there was obtained 16 g of a polymer.

The intrinsic viscosity of this polymer [η] was 0.505 at 30° C. in "FC-75".

EXAMPLE OF SYNTHESIS 1

Synthesis of CF$_2$=CFOCF$_2$CF$_2$CH=CH$_2$

Through the reaction of CF$_2$=CFOCF$_2$CF$_2$Br and chlorine gas, there was synthesized a chlorine-added substance (CF$_2$ClCFClOCF$_2$CF$_2$Br), the vinyl group of which had been protected. Subsequently, this chlorine-added substance and ethylene were reacted in an auto-clave in the presence of a radical initiator, thereby synthesizing an ehtylene-added substance (CF$_2$ClCFClOCF$_2$CF$_2$CH$_2$CH$_2$Br), to which 1 mol of ethylene was added.

Subsequently, the ethylene-added substance was treated with a mixed solution of KOH and ethanol to thereby carry out removal of HBr, followed by further removal of Cl$_2$ with a mixture of Zn and dioxane. As the result, there was obtained the intended substance of CF$_2$=CFOCF$_2$CF$_2$CH=CH$_2$ having a boiling point of 72° to 73° C. The structure of the fluorine-containing monomer was determined by measurement of $^{19}$F NMR and $^1$H NMR. spectra.

EXAMPLE 4

40 g of CF$_2$=CFOCF$_2$CF$_2$CH=CH$_2$ as obtained in the above Example of Synthesis 1 and 20 g of "R-113" were charged in a three-necked flask which had been substituted with nitrogen. To this charge in the flask, there was added

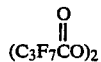

as the polymerization initiator in a quantity of 10 mg, and the reaction system was further substituted with nitrogen, after which the polymerization was conducted for five hours at 18° C. As the result, there was obtained 30 g of a polymer. This polymer could be dissolved in "R-113" and had an intrinsic viscosity [η] of 0.96 at 30° C. in metaxylenehexafluoride. It was also verified from the $^{19}$F NMR and $^1$H NMR spectra measurements that the polymer was a cyclic polymer having the following repeating structure.

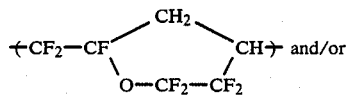

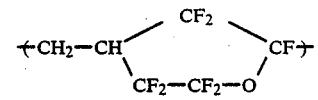

EXAMPLE 5

5 g of PAVE, 15 g of "R-113", and 80 mg of 5 wt % solution of the polymerization initiator

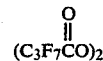

were charged in an ampoule of a 100 ml capacity and made of pressure-resistant glass. After repetition of degassing under freezing condition for three times, 0.5 g of CF$_2$=CF$_2$ was charged in the reaction system. While shaking the ampoule in an incubator, the polymerization was conducted for six hours at 30° C., from which a solid substance was obtained in a quantity of 1.5 g.

The thus obtained solid substance was dissolved in perfluoro-benzene, and its structure was verified by the $^{19}$F NMR spectrum measurement. As the result, it was found out that the polymer as obtained was a copolymer of a cyclic structure unit as shown below and a tetrafluoroethylene unit, wherein a mol ratio between a and b (a/b) was 1/0.52.

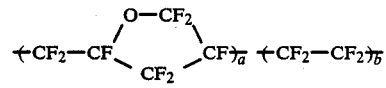

It was also found out that this copolymer had its intrinsic viscosity [η] of 0.425 at 30° C. in "FC-75".

EXAMPLE 6

5 g of PAVE, 15 g of "R-113" and 50 mg of 5 wt % "R-113" solution of the polymerization initiator

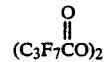

were charged in an ampoule having a 100 ml capacity and made of pressure-resistant glass. After repetition of degassing under freezing condition for three times, 0.5 g of CF$_2$=CF$_2$ was charged into the reaction system. Then, the polymerization was conducted for 45 minutes at 30° C., from which a white powder was obtained in a quantity of 1.8 g. The thus obtained solid substance was found to be a copolymer similar to that obtained in Example 5 above as the result of the $^{19}$F NMR spectrum measurement.

EXAMPLE 7

5 g of PAVE, 25 g of pure water, 0.09 g of C$_8$F$_{17}$CO$_2$NH$_4$, 0.073 g of NaH$_2$PO$_4$, and 0.0132 g of ammonium persulfate were charged in an ampoule of a 100 ml capacity and made of pressure-resistant glass.

After the reaction system was sufficiently substituted with nitrogen gas, 0.5 g of $CF_2=CF_2$ was charged into the system and the polymerization reaction was conducted for 16 hours at 60° C., while shaking the ampoule in an incubator, as the result of which there was produced 2.5 g of a solid substance.

The thus obtained solid substance was dissolved in perfluoro-benzene, and its structure was verified by means of the $^{19}F$ NMR spectrum measurement. Further, this copolymer had its intrinsic viscosity $[\eta]$ of 0.30 at 30° C. in "FC-75".

EXAMPLE 8

20 g of PAVE, 60 g of "R-113", and 20 mg of diisopropyl peroxydicarbonate as the polymerization initiator were placed in an ampoule having a 200 ml capacity and made of pressure-resistant glass. In the same manner as in Example 5 above, $CH_2=CF_2$ was charged into the reaction system and the polymerization was conducted for 4.5 hours under the same conditions as in Example 5, from which 12.3 g of a solid substance soluble in acetone was obtained.

EXAMPLE 9

5 g of PAVE, 8.74 g of perfluoropropyl-perfluorovinylether, and 5 g of 2,2'-azo-bis-isobutyronitrile were placed in an ampoule having a 100 ml capacity and made of pressure-resistant glass. After repeating the degassing under freezing condition for three time, the polymerization was conducted for 16 hours at 60° C., while shaking the ampoule in an incubator. After completion of the reaction, there was obtained 0.9 g of a solid substance.

EXAMPLE OF SYNTHESIS 2

Synthesis of $CF_2=CFCF_2CF_2CH=CH_2$ 250 g of $CF_2ClCFClCF_2CF_2CH_2CH_2I$ (as synthesized in accordance with the method as described in Japanese Unexamined Patent Publication No. 64940/1985) was treated with a mixed solution of KOH and methanol to thereby remove hydrogen and iodine, followed by further removal of chlorine with a mixture of Zn and dioxane, whereby 100 g of $CF_2=CFCF_2CF_2CH=CH_2$ having a boiling point of 66° C. was obtained. The structure of this fluorine-containing monomer was verified by the $^{19}F$ NMR and $^1H$ NMR spectra measurements.

EXAMPLE OF SYNTHESIS 3

Synthesis of $CH_2=CH(CF_2)_4CH=CH_2$ By a known method, $CH_2=CH(CF_2)_4CH=CH_2$ was synthesized from α,ω-diiodoperfluorobutane in two-stage reaction (ethylene addition reaction and hydrogen and iodine removing reaction).

EXAMPLE 10

21 g of $CF_2=CFCF_2CF_2CH=CH_2$ as obtained in the above-described Example of Synthesis 2 and 38 g of "R-113" were placed in a three-necked flask, to which 15 mg of

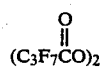

as the polymerization initiator was added. After the reaction system was further substituted with nitrogen, the polymerization reaction was conducted for 12 hours at 20° C. As the result, there was obtained 14 g of a polymer. This polymer could be dissolved in tetrahydrofuran (hereinafter abbreviated as "THF"), and had its intrinsic viscosity $[\eta]$ of 0.62 at 30° C. in THF.

COMPARATIVE EXAMPLE

The same procedure as in Example 10 above was followed, with the exception that 25.4 g of $CH_2=CH(CF_2)_4CH=CH_2$ obtained in the above Example of Synthesis 3 was used in place of $CF_2=CFCF_2CF_2CH=CH_2$, thereby carrying out the polymerization. No polymer having high molecular weight could be obtained after 12 hours' polymerization reaction.

EXAMPLE OF SYNTHESIS 4

Synthesis of $CF_2=CFOCF_2CF_2CF=CF_2$ 2,000 g of $CF_2ClCFClCF_2COF$ was reacted with hexafluoropropyleneoxide in the presence of cesium fluoride, and was further converted into potassium salt thereof by use of potassium hydroxide, after which the substance was subjected to thermal decomposition, thereby obtaining $CF_2ClCFClCF_2CF_2OCF=CF_2$ as the product. Subsequently, this product was reacted with a mixture of Zn and dioxane to carry out removal of chlorine, thereby obtaining 300 g of $CF_2=CFCF_2CF_2OCF=CF_2$ having a boiling point of 64° C. The structure of this fluorine-containing monomer was verified by the $^{19}F$ NMR spectrum measurement.

EXAMPLE 11

5.42 g of $CF_2=CFOCF_2CF_2CF=CF_2$ (hereinafter abbreviated as "PBVE" as obtained in the above-described Example of Synthesis 4 and 10 mg of the polymerization initiator

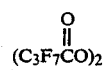

were placed in an ampoule having an inner volume of 50 ml and made of pressure-resistant glass. After degassing under freezing condition was repeated for two times, the polymerization reaction was conducted for 48 hours at 25° C. The pressure during the polymerization reaction was lower than the atmospheric pressure. From this polymerization reaction, there was obtained 2.22 g of a polymer.

When the infrared ray absorption spectrum of this polymer was measured, there could be observed no absorption in the vicinity of 1790 cm$^{-1}$ to be derived from the double bond which was present in the starting monomeric substance. Further, when this polymer was dissolved in perfluorobenzene and its $^{19}F$ NMR spectrum was measured, there was obtained the spectrum which indicated the following repeating structure.

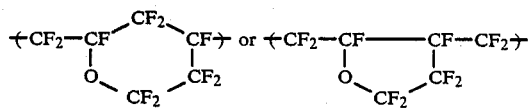

The intrinsic viscosity of this polymer $[\eta]$ was 0.55 at 30° C. in "FC-75", which indicated that this polymer had a high degree of polymerization.

The glass transition temperature of this polymer was 108° C. At a room temperature, this polymer assumed a state of tough and transparent glass. Also, it had 10% thermal decomposition temperature of 457° C., thus indicating high thermal stability. By the way, this polymer was colorless transparent, and had its refractive index of as low as 1.34 and its light transmission factor of as high as 95%.

EXAMPLE 12

5 g of PAVE, 5 g of PBVE and 10 mg of the polymerization initiator

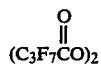

were placed in a glass reactor having an inner volume of 60 ml. After the degassing under freezing condition for two times, polymerization was conducted for 24 hours at 25° C., while agitating the reactants. The pressure during the polymerization reaction as lower than the atmospheric pressure. As the result, there was obtained 5.5 g of a polymer.

When the infrared ray absorption spectrum of this polymer was measured, there could be observed no absorption in the vicinity of 1790 cm$^{-1}$ to be derived from the double bond which was present in the starting monomeric substance. Further, this polymer was dissolved in perfluorobenzene and its $^{19}$F-NMR spectrum was measured to verify its structure. As the result, the obtained polymer was found to be a copolymer consisting of: a unit of the cyclic structure to be derived from PAVE such as represented by the following formula:

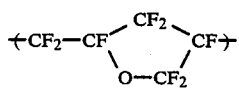

and a unit of the cyclic structure to be derived from PBVE such as represented by the following formula:

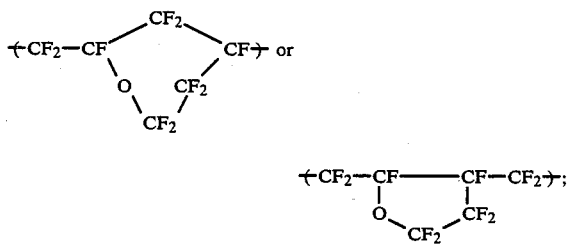

and containing therein 54% by weight of the unit of the cyclic structure to be derived from PAVE.

This polymer was found to have its intrinsic viscosity [η] of 0.44 at 30° C. in "FC-75", hence high degree of polymerization.

The glass transition point of this polymer was 91° C. and indicated a state of its being tough and transparent glass at a room temperature. Further, its 10% thermal decomposition temperature was 435° C., thus indicating that the polymer had high thermal stability. Furthermore, this polymer was colorless transparent, and had its refractive index of as low as 1.34 and its light transmission factor of as high as 95%.

EXAMPLE 13

20 g of PBVE obtained in Example of Synthesis 4 and 40 mg of the polymerization initiator

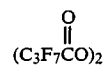

were placed in an ampoule having an inner volume of 200 ml and made of pressure-resistant glass. After repetition of the degassing under freezing condition for two times, 1.0 g of CF$_2$=CFCl was charged into the reaction system. While shaking the ampoule in an incubator, the polymerization reaction was conducted for 10 hours at 25° C. As the result, there was obtained a polymer in a quantity of 4.5 g.

Upon measurement of the infrared ray absorption spectrum of this polymer, it was found that there was no absorption in the vicinity of 1790 cm$^{-1}$ due to the double bond which was present in the starting monomeric substance. Further, this polymer was dissolved into perfluorobenzene, and its structure was verified by measurement of the $^{19}$F-NMR spectrum. As the result, the thus obtained polymer was found to be a copolymer consisting of: a unit of the cyclic structure to be derived from PBVE such as represented by the following formula:

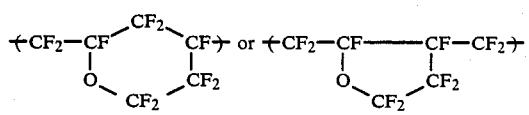

and a unit of the structure to be derived from CF$_2$=CFCl as represented by the following formula:

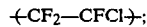

and containing therein 84% by weight of the unit of the cyclic structure to be derived from PBVE. This polymer had its intrinsic viscosity of 0.43 in "FC-75" at 30° C., thus indicating that it had high degree of polymerization.

The polymer was in a state of its being tough and transparent glass at a room temperature. It had also a 10% thermal decomposition temperature of 421° C., which showed that it had high thermal stability. Further, the polymer showed its solubility in a mixed solution of "FC-75" and "R-113".

EXAMPLE 14

20 g of PBVE obtained in Example of Synthesis 4 above and 20 mg of the polymerization initiator

were placed in an ampoule having an inner volume of 200 ml and made of pressure-resistant glass. After repetition of the degassing under freezing condition for two times, 0.5 g of CF$_2$=CF$_2$ was charged in the reaction system. While shaking this ampoule in an incubator, the polymerization reaction was conducted for five hours at a temperature of 25° C. As the result, there was obtained 5.8 g of a polymer.

Upon measurement of the infrared ray absorption spectrum of this polymer, there could be observed no absorption in the vicinity of 1790 cm$^{-1}$ to be derived from the double bond which was present in the starting monomeric substance. Further, this polymer was dissolved in perfluorobenzene to measure its $^{19}$F-NMR spectrum, from which its structure was verified. As the result of this, the thus obtained polymer was found to be a copolymer consisting of: a unit of the cyclic structure to be derived from PBVE such as represented by the following formula:

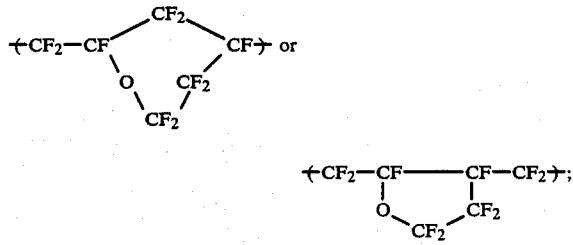

and a unit of the structure to be derived from $CF_2=CF_2$ as represented by the following formula:

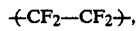

and containing therein 94% by weight of the unit of the cyclic structure to be derived from PBVE. Further, this polymer had its intrinsic viscosity [η] of 0.53 in "FC-75" at 30° C., thus indicating that it had high degree of polymerization. It also indicated a state of its being a tough and transparent polymer at a room temperature.

EXAMPLE 15

9 g of PAVE, 1 g of $CF_2$=CF—O—$CF_2CF_2CF_2COOCH_3$, and 10 mg of the polymerization initiator

were placed in an ampoule having an inner volume of 50 ml and made of pressure-resistant glass. After repetition of the degassing under freezing condition for two times, the polymerization was conducted for 24 hours at a temperature of 25° C. The pressure during the polymerization reaction was lower than the atmospheric pressure As the result, there was obtained 3.55 g of a polymer.

This polymer was dissolved in perfluorobenzene to measure its $^{19}$F-NMR spectrum, from which its structure was verified. As the result, the thus obtained polymer was found to be a copolymer consisting of a unit of the cyclic structure to be derived from PAVE such as represented by the following formula:

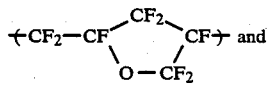

a unit of the structure of the formula:

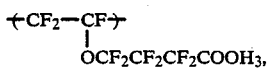

and containing therein 93% by weight of the unit of the cyclic structure to be derived from PAVE.

This polymer had its intrinsic viscosity [η] of 0.32 in "FC-75" at 30° C., thus indicating that it had a high degree of polymerization.

The polymer had its glass transition point of 64° C., and indicated a state of its being tough and transparent glass. Also, its 10% thermal decomposition temperature was 430° C., thus indicating that it had high thermal stability. Further, this polymer was colorless transparent.

EXAMPLE 16

40 g of PAVE, 5 g of $CF_2$=CF—O—$CF_2CF_2CF_2COOCH_3$, and 10 mg of diisopropyl peroxydicarbonate as the polymerization initiator were placed in an ampoule having an inner volume of 100 ml and made of pressure-resistant glass. After repetition of the degassing under freezing condition for two times, 5 g of $CF_2=CF_2$ was charged into the reaction system. While shaking this ampoule in an incubator, the polymerization was conducted for 72 hours at a temperature of 30° C. As the result, there was obtained 11.8 g of a polymer.

This polymer was dissolved in perflurobenzene to measure its $^{19}$F-NMR spectrum, from which its structure was verified. As the result, the thus obtained polymer was found to be a copolymer consisting of: a unit of the cyclic structure to be derived from PAVE such as represented by the following formula:

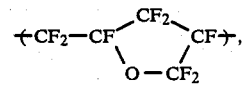

and units of the formulas:

derived from $CF_2$=CF—O—$CF_2CF_2CF_2COOCH_3$ and $CF_2=CF_2$, respectively, and containing therein 82% by weight of the unit of the cyclic structure to be derived from PAVE.

This polymer had its intrinsic viscosity [η] of 0.42 in "FC-75" at 30° C., thus indicating that it had high degree of polymerization.

The polymer was found to have its glass transition point of 58° C., and indicated a state of its being tough and transparent polymer at a room temperature. Further, its 10% thermal decomposition temperature was 421° C., thus indicating that it had high thermal stability. Furthermore, the polymer was colorless transparent.

EXAMPLE 17

8 g of PBVE, 1 g of $CF_2$=$CFOCF_2CF(CF_3)OCF_2CF_2SO_2F$ and 10 mg of the polymerization initiator

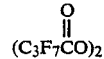

were placed in an ampoule having an inner volume of 50 ml and made of pressure-resistant glass. After repetition of the degassing under freezing condition for two times, polymerization was conducted for 24 hours at 25° C. The pressure during the polymerization reaction was lower than the atmospheric pressure. As the consequence, there was obtained 3.8 g of a polymer. This polymer was dissolved in perfluorobenzene to measure its $^{19}$F-NMR spectrum, from which its structure was verified. As the result, the thus obtained polymer was found to be a copolymer consisting of: a unit of the cyclic structure to be derived from PBVE such as represented by the following formula:

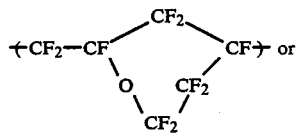 or

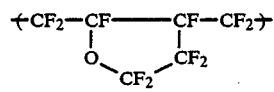;

and a unit of the structure to be derived from $CF_2=CFOCF_2CF(CF_3)OCF_2CF_2SO_2F$ as represented by the following formula:

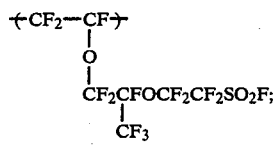

and containing therein 94% by weight of the unit of the structure to be derived from PBVE.

It was found that this polymer had its intrinsic viscosity [η] of 0.38 in "FC-75" at 30° C., thus indicating that it had high degree of polymerization.

The polymer had its glass transition point of 92° C., and indicated a state of its being tough and transparent glass. The polymer was colorless transparent. The adhesive property of this polymer with glass was satisfactory.

EXAMPLE 18

8 g of PAVE, 2 g of $CF_2=CF-O-CF_2CF_2CF_3$, and 10 mg of the polymerization initiator

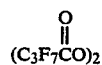

were placed in an ampoule having an inner volume of 50 ml and made of pressure-resistant glass. After repetition of the degassing under freezing condition for two times, the polymerization was conducted for 24 hours at a temperature of 25° C. The pressure during the polymerization reaction was lower than the atmospheric pressure. As the result, there was obtained a polymer in a quantity of 1.85 g.

This polymer was dissolved in perfluorobenzene to measure its $^{19}$F-NMR spectrum, from which its structure was verified. As the consequence, the thus obtained polymer was found to be a copolymer consisting of: a unit of the cyclic structure to be derived from PAVE such as represented by the following formula:

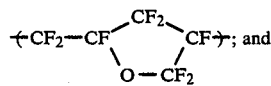; and a unit of the structure to be derived from $CF_2=CF-O-CF_2CF_2CF_3$ as represented by the following formula:

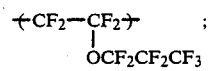;

and containing therein 89% by weight of the unit of the cyclic structure to be derived from PAVE.

It was further found that this polymer had its intrinsic viscosity [η] of 0.35 in "FC-75" at 30° C., thus indicating that it had high degree of polymerization.

The polymer had its glass transition point of 61° C., and indicated a state of its being tough and transparent glass. Furthermore, its 10% thermal decomposition temperature was 415° C., thus indicating that the polymer had high thermal stability. Moreover, this polymer was colorless transparent, and showed its elongation of 250% at 25° C.

The present invention has its excellent effect such that, by adoption of the particular fluorine-containing monomers as the component for the polymerization, it is able to produce advantageously and smoothly the fluorine-containing polymer having the cyclic structure in the main chain of the polymer. In particular, it has such effect that achieves the cyclic polymerization of the straight chain monomer without adopting the very high pressure condition and the high diluting condition. It can further be recognized that, by adoption of those monomers having particular molecular structure, by-production of the gel during the polymerization reaction can be effectively suppressed.

Furthermore, the present invention has such an effect that, on account of its being able to introduce into the main chain of various polymers the cyclic structure, particularly the fluorine-containing cyclic structure, various excellent and useful properties can be imparted to the resulting fluorine-containing polymers. That is to say, the fluorine-containing polymer having the cyclic structure in the main chain, to be obtained by the present invention, is such one that is amorphous, transparent and soluble in solvent, while retaining its excellent properties of the fluorine-containing polymer such as, for example, heat-resistance, chemical stability, and so forth. From such characteristic features, the fluorine-containing polymer of the present invention is recognized to have such effect that it can be formed into an ultra-thin film free from defects such as pin-hole, etc., hence it finds wide varieties of use as the optical material, the coating material, the material for separating membrane, and others. To add more, when it is used in combination with, for example, PTFE and other conventional fluorine-containing polymers, the fluorine-containing polymer of the present invention is able to give its useful properties of non-crystallinity, transparency, solubility to solvent, and so on, without impairing the desirable properties inherent in the fluorine-containing polymer such as heat-resistance, chemical stability, electrical characteristic, etc. Such combined use of the fluorine-containing polymer of the present invention and those conventional fluorine-containing polymer still makes it possible to form an ultra-thin film.

We claim:

1. A method for cyclic polymerization, which comprises subjecting a fluorine-containing monomer to cyclic polymerization, said fluorine-containing monomer having two acyclic carbons bonded to each other by a multiple bond, one carbon of which is linked by a linking chain to one carbon of two other acyclic carbons bonded to each other by a multiple bond, the carbon-carbon multiple bonds each having different polymerizability, the linking chain having a straight chain portion of from 2 to 7 atoms, and the monomer having a fluorine content of at least 10% by weight, said cyclic polymerization being carried out with an initial monomer concentration of said monomer of greater than 12% by weight.

2. A method according to claim 1, wherein said fluorine-containing monomer contains therein the multiple bonds selected from: two multiple bonds of asymmetrical structure, a vinyl ether group and an allyl group, a vinyl ether group and a vinyl group, a fluorine-containing multiple bond and a hydrocarbon multiple bond, or a perfluoro multiple bond and a partially fluorinated multiple bond.

3. A method according to claim 1, wherein said fluorine-containing monomer is copolymerized with another fluorine-containing monomer or a hydrocarbon monomer.

4. A method according to claim 1, wherein said cyclic polymerization is carried out by bulk polymerization, solution-polymerization, suspension-polymerization, or emulsion-polymerization.

5. A method according to claim 1, wherein said cyclic polymerization is carried out at a temperature ranging from zero to 200° C., and under a reduced pressure or a pressure ranging from normal pressure to 100 atm.

6. A method according to claim 1, wherein said fluorine-containing monomer is homo-polymerized or co-polymerized.

7. A method according to claim 1, wherein said fluorine-containing monomer is copolymerized with other monomer or fluorine-containing type or hydrocarbon type.

8. The method of claim 1 wherein one of the multiple bonds is in the structure $CF_2=CF-$ and the other is in the structure $CF_2=CF-$ or $CH_2=CH-$.

9. The method of claim 1 wherein the fluorine-containing monomer is $CF_2=CFOCF_2CF=CF_2$, $CF_2=CFOCF_2CF_2CF=CF_2$, $CF_2=CFOCF_2CF=CH_2$,

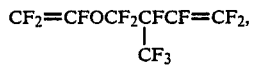

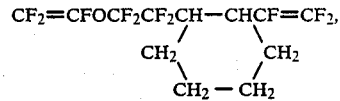

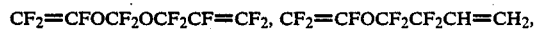

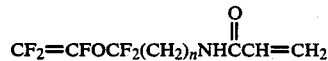

(where: $n$ is an integer of 1 to 4),

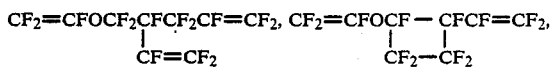

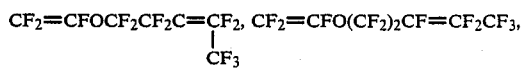

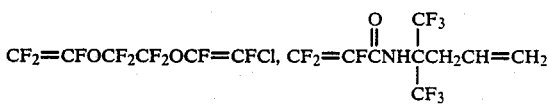

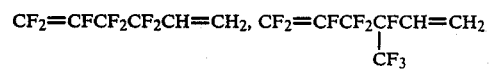

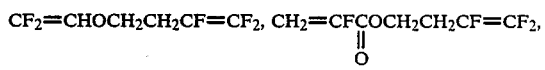

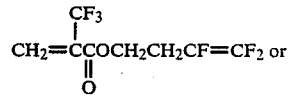

10. The method of claim 8 wherein the fluorine containing monomer is perfluoroallyl vinyl ether.

11. The method of claim 8 wherein the fluorine containing monomer is $CF_2=CFOCF_2CF=CF_2$.

12. The method of claim 8 wherein said fluorine-containing monomer is copolymerized with tetrafluorothylene or vinylidene fluoride.

* * * * *

UNITED STATES PATENT AND TRADEMARK OFFICE
CERTIFICATE OF CORRECTION

PATENT NO. : 4,910,276
DATED : MARCH 20, 1990
INVENTOR(S) : NAKAMURA et al.

It is certified that error appears in the above-identified patent and that said Letters Patent is hereby corrected as shown below:

Column 20:

Claim 11, line 2,

"$CF_2=CFOCF_2CF=CF_2$" should read --$CF_2=CFOCF_2CF_2CF=CF_2$--

Claim 12, line 2,

"tetrafluorothy-" should read -- tetrafluoroethy- --

Signed and Sealed this

Seventh Day of July, 1992

Attest:

DOUGLAS B. COMER

Attesting Officer

Acting Commissioner of Patents and Trademarks